US007836512B2

(12) United States Patent
Mizuki et al.

(10) Patent No.: US 7,836,512 B2
(45) Date of Patent: Nov. 16, 2010

(54) INFORMATION TRANSMISSION TERMINAL, INFORMATION TRANSMISSION METHOD, ARTICLE INFORMATION TRANSMISSION SYSTEM AND ARTICLE INFORMATION TRANSMISSION METHOD

(75) Inventors: Atsushi Mizuki, Yokohama (JP); Hiroaki Hagino, Yokohama (JP); Tatsuo Takahashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 846 days.

(21) Appl. No.: 11/527,543

(22) Filed: Sep. 27, 2006

(65) Prior Publication Data

US 2007/0073564 A1  Mar. 29, 2007

(30) Foreign Application Priority Data

Sep. 28, 2005  (JP)  ............................ P2005-282486

(51) Int. Cl.
  *G06F 21/00* (2006.01)
(52) U.S. Cl. .................... 726/27; 726/1; 726/2; 726/26; 726/28; 726/29; 713/182; 705/50
(58) Field of Classification Search ................ None
  See application file for complete search history.

(56) References Cited

U.S. PATENT DOCUMENTS

| 2003/0084300 | A1 | 5/2003 | Koike | |
|---|---|---|---|---|
| 2006/0032901 | A1* | 2/2006 | Sugiyama et al. | 235/375 |
| 2008/0309461 | A1* | 12/2008 | Mizuki et al. | 340/10.1 |

FOREIGN PATENT DOCUMENTS

| EP | 0 905 943 A2 | 3/1999 |
|---|---|---|
| JP | 2003-132160 | 5/2003 |
| JP | 2004-171343 | 6/2004 |
| JP | 2004-310458 | 11/2004 |

OTHER PUBLICATIONS

F. C. Breslau, et al., "Object Request Broker Timeout Capability", ip.com, vol. 39, No. 12, Dec. 1, 1996, pp. 1-3.

(Continued)

*Primary Examiner*—Taghi T Arani
*Assistant Examiner*—Amir Mehrmanesh
(74) *Attorney, Agent, or Firm*—Oblon, Spivak, McClelland, Maier & Neustadt, L.L.P.

(57) ABSTRACT

There are provided an information transmission terminal, an information transmission method, an article information transmission system and an article information transmission method capable of including personal information under other users' control into items to be transmitted while protecting the user privacy.

A user terminal 20 transfers a transmission request and a usage policy of personal information to the respective transfer destination terminals 30 in accordance with the kind of personal information requested from a personal information collecting server 10, and collects personal information transmitted from the respective transfer destination terminals 30 responding thereto to transmit to the personal information collecting server 10. In this process, the respective transfer destination terminals 30 can judge whether or not the transmission of the requested personal information based on the transferred usage policy violates the privacy of the users of the transfer destination terminals 30. Therefore, the user terminal 20 can transmit personal information under control of users of the respective transfer destination terminals 30 to the personal information collecting server 10 while protecting the user privacy.

4 Claims, 22 Drawing Sheets

OTHER PUBLICATIONS

Dirk Henrici, et al., "Hash-based Enhancement of Location Privacy for Radio-Frequency Identification Devices using Varying Identifiers", Pervasive Computing and Communications Workshops, Mar. 14, 2004, XP-010689745, pp. 149-153.

* cited by examiner

Fig. 3

| INFORMATION OF USER | INFORMATION TO BE COLLECTED | PURPOSE OF COLLECTION | COMPENSATION INFORMATION | KIND OF OPERATION |
|---|---|---|---|---|
| SERVICE PROVIDER A | LOCATION INFORMATION OF USER | TO PROVIDE ADVERTISEMENT DISTRIBUTION CORRESPONDING TO LOCATION OF USER | PROVIDE SERVICE | READ ONLY |
| SERVICE PROVIDER A | ACCOMPANYING PERSON INFORMATION | QUESTIONNAIRE FOR INCREASING SERVICE | IMPART OF POINTS | READ ONLY |
| SERVICE PROVIDER A | RELATED USERS | QUESTIONNAIRE FOR INCREASING SERVICE | PROVIDE SERVICE OR IMPART OF POINTS | READ ONLY |
| ... | ... | ... | ... | ... |

Fig.5

| INFORMATION TO BE COLLECTED | CANDIDATE OF INFORMATION TRANSMITTER | PERSONAL INFORMATION ITEM |
|---|---|---|
| INFORMATION OF USER LOCATION | USER TERMINAL ONLY | PRESENT LOCATION |
| ACCOMPANYING PERSON INFORMATION | USER TERMINAL + BROADCAST | NAME |
| RELATED USERS | BROADCAST | SEX, AGE |
| ⋮ | ⋮ | ⋮ |

Fig.7

| INFORMATION OF USER | INFORMATION OF TRANSFERRING USER | PERSONAL INFORMATION ITEM | PURPOSE OF COLLECTION | COMPENSATION INFORMATION | KIND OF OPERATION |
|---|---|---|---|---|---|
| SERVICE PROVIDER A | USER K | NAME | IN ORDER FOR USER K TO RECEIVE POINTS GRANTED BY SERVICE PROVIDER A | NONE | READ ONLY |
| SERVICE PROVIDER A | USER K | SEX, AGE | IN ORDER FOR USER K TO RECEIVE POINTS GRANTED BY SERVICE PROVIDER A | IMPART OF POINTS | READ ONLY |
| ... | ... | ... | ... | ... | ... |

Fig.8

| NAME | USER K |
|---|---|
| SEX | FEMALE |
| AGE | ○○ YEARS OLD |
| TELEPHONE NUMBER | 090-○○○○-○○○○ |
| MAIL ADDRESS | userk@xxx.xxx |
| PRESENT LOCATION | NORTH LATITUDE···°<br>EAST LONGITUDE···° |
| CARRYING ARTICLES | BAG, WALLET, UMBRELLA |
| ⋮ | ⋮ |

Fig.10

| PERSONAL INFORMATION ITEM | DISCLOSURE RANGE | PURPOSE OF COLLECTION | COMPENSATION INFORMATION | KIND OF USAGE |
|---|---|---|---|---|
| PRESENT LOCATION | CONTRACTED SERVICE PROVIDER | ADVERTISEMENT DISTRIBUTION OR QUESTIONNAIRE | PROVIDE SERVICE OR IMPART OF POINTS | READ ONLY |
| NAME | ALL | ALL | NAME OF ACCESSING PERSON | READ ONLY |
| SEX, AGE | SERVICE PROVIDER A, B, C | ALL | PROVIDE SERVICE OR IMPART OF POINTS | READ ONLY |
| ... | ... | ... | ... | ... |

Fig.11

| NAME | USER L |
|---|---|
| SEX | MALE |
| AGE | × × YEARS OLD |
| TELEPHONE NUMBER | 090-× × × ×-× × × × |
| MAIL ADDRESS | userl@xxx.xxx |
| PRESENT LOCATION | NORTH LATITUDE···°<br>EAST LONGITUDE···° |
| CARRYING ARTICLES | BAG, CAP |
| ⋮ | ⋮ |

Fig.13

| PERSONAL INFORMATION ITEM | DISCLOSURE RANGE | PURPOSE OF COLLECTION | COMPENSATION INFORMATION | KIND OF USAGE |
|---|---|---|---|---|
| PRESENT LOCATION | CONTRACTED SERVICE PROVIDER | ADVERTISEMENT DISTRIBUTION | PROVIDE SERVICE | READ ONLY |
| NAME | ALL | ALL | NAME OF ACCESSING PERSON | READ ONLY |
| SEX, AGE | SERVICE PROVIDER A, B, C | ALL | IMPART OF POINTS | READ ONLY |
| ... | ... | ... | ... | ... |

Fig.16

| INFORMATION OF USER | INFORMATION TO BE COLLECTED | PURPOSE OF COLLECTION | COMPENSATION INFORMATION | KIND OF OPERATION |
|---|---|---|---|---|
| SERVICE PROVIDER A | BRAND NAME | QUESTIONNAIRE FOR INCREASING SERVICE | IMPART OF POINTS | READ ONLY |
| ... | ... | ... | ... | ... |

Fig. 17

| ARTICLE INFORMATION | ID INFORMATION | COLOR | BRAND | DATE OF MANUFACTURE |
|---|---|---|---|---|
| WALLET | 0011102 | RED | MANUFACTURED BY ○○ | ○○/○○/○○ |
| ... | ... | ... | ... | ... |

Fig.18

| INFORMATION TO BE COLLECTED | DISCLOSURE RANGE | PURPOSE OF DISCLOSURE | COMPENSATION INFORMATION | KIND OF USAGE |
|---|---|---|---|---|
| BRAND NAME | ALL | ADVERTISEMENT DISTRIBUTION OR QUESTIONNAIRE | IMPART OF POINTS | READ ONLY |
| ... | ... | ... | ... | ... |

*Fig.19*

| ID INFORMATION | OWNER INFORMATION |
|---|---|
| 0011100 | USER S (192.168.1.1) |
| 0011101 | USER T (192.168.1.2) |
| ⋮ | ⋮ |

Fig.20

| ARTICLE INFORMATION | ID INFORMATION | COLOR | BRAND | DATE OF MANUFACTURE |
|---|---|---|---|---|
| BAG | 0011100 | BLACK | MANUFACTURED BY ×× | ××/××/×× |
| ... | ... | ... | ... | ... |

Fig.21

| INFORMATION TO BE COLLECTED | DISCLOSURE RANGE | PURPOSE OF COLLECTION | COMPENSATION INFORMATION | KIND OF USAGE |
|---|---|---|---|---|
| BRAND NAME | ALL | QUESTIONNAIRE | IMPART OF POINTS | READ ONLY |
| ... | ... | ... | ... | ... |

INFORMATION TRANSMISSION TERMINAL, INFORMATION TRANSMISSION METHOD, ARTICLE INFORMATION TRANSMISSION SYSTEM AND ARTICLE INFORMATION TRANSMISSION METHOD

BACKGROUND OF THE INVENTION

1. Field of the Invention

The present invention relates to an information transmission terminal, an information transmission method, an article information transmission system and an article information transmission method.

2. Related Background of the Invention

Related Background Art

Recently, in order to realize a ubiquitous society, a technology, which manages personal information held by users on a network and utilizes the personal information to provide various services, has been under development. The personal information to be handled includes, for example, information for identifying an individual such as name, date of birth, sex and the like of a user, information about articles presently carried by a user, information of location of a user and the like. Therefore, to develop such a technology, it is a critical problem to ensure both of the collecting performance of personal information and the protection of user privacy.

As a technique related to this field, for example, a distributed disclosure control method of personal information described in Japanese Patent Application Laid-Open No. 2004-171343 is known. In this distributed disclosure control method, when a usage policy of personal information fails to satisfy a disclosure policy, which is previously set in a personal terminal, the contents of the requested personal information are limited so as to satisfy the disclosure policy, or a compensation for a transmission of the personal information is proposed. Owing to this, transmission of personal information from personal terminals is encouraged within a range that the personal information can be disclosed.

SUMMARY OF THE INVENTION

However, the above-described conventional distributed disclosure control method is a technique to perform a negotiation about personal information, which can be disclosed with respect to a single user terminal. Personal information which is beyond authorized range of the single user terminal; i.e., personal information under the management of other users is originally not included in the items to be collected. Thus, another transmission request for the personal information has to be made. Therefore, in view of increasing collecting performance of personal information, such a technique capable of including personal information managed by other users into the items to be transmitted while protecting the user privacy, has been desired.

The present invention has been proposed to solve the above problem. An object of the present invention is to provide an information transmission terminal, an information transmission method, an article information transmission system, and an article information transmission method capable of including personal information managed by other users into items to be transmitted while protecting the user privacy.

To solve the above problem, an information transmission terminal in accordance with the present invention is one for transmitting personal information of a plurality of users including a user of the terminal to a predetermined communication device, comprising: a request receiving means that receives a transmission request information requesting a transmission of the personal information and a usage policy prescribing a utilization range of the personal information from the predetermined communication device; a transfer destination information storing means that stores a transfer destination reference table previously associating the personal information with transfer destinations of the transmission request information and the usage policy based on the kind of the personal information; a request transferring means that transfers the transmission request information and the usage policy received by the request receiving means to each of the transfer destinations in accordance with the transfer destination reference table; and a personal information transmitting means that transmits personal information received from the respective transfer destinations to the predetermined communication device responding to the transfer of the transmission request information and the usage policy by the request transferring means.

In the information transmission terminal, a transmission request and a usage policy of personal information are transferred to the terminals of the respective transfer destinations corresponding to the kind of the personal information requested by a predetermined communication device, and personal information transmitted from transfer destinations responding to the request is collected and transmitted to the predetermined communication device. At this time, it is arranged such that the respective transfer destinations can judge whether or not the transmission of the requested personal information violates the privacy of the users of the transfer destinations based on the transferred usage policy. Accordingly, the information transmission terminal can transmit the personal information managed by other users to the predetermined communication device while protecting the user privacy using the information transmission terminal as a terminal. This contributes to improvement of collecting performance of personal information and enables to develop a system which provides highly sophisticated service utilizing personal information.

Also, the request transferring means preferably adds user identifying information for identifying a user of the information transmission terminal to the transmission request information and the usage policy to be transferred to the respective transfer destinations. Owing to this, the transfer destinations, to which the transmission request and the usage policy of the personal information are transferred, can recognize the user of the information communication terminal as the terminal. Accordingly, the transmission of personal information from transfer destinations can be accelerated.

Moreover, the personal information transmitting means preferably transmits information of absence representing absence of the respective transfer destinations to the predetermined communication device when the personal information transmitting means receives no response from any of the respective transfer destinations until a predetermined period of time has passed from a point when the request transferring means transfers the transmission request information and the usage policy to the respective transfer destinations. In this case, the predetermined communication device side can recognize the collection status of the personal information from the transfer destinations.

An information communication method in accordance with the present invention is one for transmitting personal information of a plurality of users including a user of the terminal to a predetermined communication device, comprising the steps of: receiving a transmission request information requesting a transmission of the personal information and a usage policy prescribing a utilization range of the personal information from the predetermined communication device with a request receiving means; transferring the transmission request information and the usage policy received by the request receiving means to the respective transfer destinations through a request transferring means in accordance with a transfer destination reference table previously associating the personal information with the transfer destinations of the transmission request information and the usage policy based on the kind of the personal information; and transmitting personal information received from the respective transfer destinations to the predetermined communication device through a personal information transmitting means responding to the transfer of the transmission request information and the usage policy by a request transferring means.

In the information communication method, a transmission request and a usage policy of personal information are transferred to the respective transfer destinations corresponding to the kind of the personal information requested by the predetermined communication device, and personal information to be transmitted from the transfer destinations responding thereto is collected and transmitted to the predetermined communication device. At this time, it is arranged such that the respective transfer destinations can judge whether or not the transmission of the requested personal information violates the privacy of the user of the transfer destination based on the transferred usage policy. Accordingly, with the information transmission method, personal information, which is managed by other users, can be transmitted to the predetermined communication device while protecting the user privacy using the information transmission terminal as a terminal. This contributes to improvement of collecting performance of personal information and enables to develop a system which provides a highly sophisticated service utilizing personal information.

An article information transmission system in accordance with the present invention is one for transmitting article information of articles around a user to a predetermined communication device, comprising: a request receiving means that receives a transmission request information requesting a transmission of the article information and a usage policy prescribing a utilization range of the article information from the predetermined communication device; an identification information obtaining means that obtains an article identification information for identifying the article from an identification element attached to an article around the user when the request receiving means receives the transmission request information; an owner information storing means that stores an owner reference table previously associating owner information representing an owner of the article with the article identification information; a request transferring means that transfers the transmission request information and the usage policy received by the request receiving means to a terminal of the owner of the article based on the owner reference table; and an article information transmitting means that transmits the article information received from the terminal of the owner of the article to the predetermined communication device responding to the transfer of the transmission request information and the usage policy by the request transferring means.

In the article information transmission system, when a transmission request and a usage policy of article information from the predetermined communication device are received, the owner of the article is identified from an article identification information of the article around the user. Then, the transmission request and the usage policy are transferred to the terminal of the owner; the article information transmitted from the terminal of the owner responding thereto is collected and transmitted to the predetermined communication device. At this time, it is arranged such that the terminals of the respective owners can judge whether or not the transmission of the requested article information violates the privacy of the owner of the article based on the transferred usage policy. Accordingly, in the article information transmission system, article information of the article, which is owned by other user, can be transmitted to the predetermined communication device while protecting the user privacy. This contributes to improvement of collecting performance of article information and enables to develop a system which provides a highly sophisticated service utilizing article information.

An article information transmission method in accordance with the present invention is one for transmitting article information of articles around a user to a predetermined communication device, comprising the steps of: receiving a transmission request information requesting a transmission of article information and a usage policy prescribing utilization range of the article information from the predetermined communication device with a request receiving means; obtaining an article identification information for identifying the article from an identification element attached to the article with an identification information obtaining means when a request receiving means receives the transmission request information; transferring the transmission request information and the usage policy received by a request receiving means to a terminal of an owner of the article in accordance with an owner reference table previously associating owner information representing the owner of the article with the article identification information with a request transferring means; and transmitting article information received from the terminal of the owner of the article responding to the transfer of the transmission request information and the usage policy by a request transferring means to the predetermined communication device with an article information transmitting means.

In the article information transmission method, when a transmission request and a usage policy of article information from the predetermined communication device are received, the owner of the article is identified from an article identification information of the article around the user. And, the transmission request and the usage policy are transferred to the terminal of the owner; and the article information transmitted from the terminal of the owner responding thereto are collected and transmitted to the predetermined communication device. At this time, it is arranged such that the terminals of the respective owners can judge whether or not the transmission of the requested article information violates the privacy of the owner of the article based on the transferred usage policy. Accordingly, in the article information transmission system, article information of the article, which is owned by other users, can be transmitted to the predetermined communication device while protecting the privacy of the users using the information transmission terminal as the terminal. This contributes to improvement of collecting performance of article information and enables to develop a system which provides a highly sophisticated service utilizing article information.

As described above, according to the information transmission terminal, the information transmission method, the article information transmission system and the article information transmission method in accordance with the present invention, personal information managed by another user can be included in items to be transmitted while protecting the user privacy.

BRIEF DESCRIPTION OF THE DRAWINGS

FIG. 3 is a diagram showing an example of information stored in the usage policy shown in FIG. 2.

FIG. 5 is a diagram showing an example of information stored in the transfer destination reference table shown in FIG. 4.

FIG. 7 is a diagram showing an example of information stored in the usage policy for transfer shown in FIG. 6.

FIG. 8 is a diagram showing an example of personal information stored in a user terminal.

FIG. 10 is a diagram showing an example of information stored in the privacy policy shown in FIG. 9.

FIG. 11 is a diagram showing an example of personal information stored in a transfer destination terminal.

FIG. 13 is a diagram showing an example of information stored in the privacy policy shown in FIG. 12.

FIG. 16 is a diagram showing an example of usage policy of article information.

FIG. 17 is a diagram showing an example of the article information stored in a user terminal.

FIG. 18 is a diagram showing an example of information stored in a privacy policy of the article information in the user terminal.

FIG. 19 is an example of information stored in an owner reference table stored in an ID recognition server.

FIG. 20 is a diagram showing an example of article information stored in a transfer destination terminal.

FIG. 21 is a diagram showing an example of information stored in a privacy policy of the article information in the transfer destination terminal.

DESCRIPTION OF THE PREFERRED EMBODIMENTS

Hereinafter, a preferred embodiment of an information transmission terminal, an information transmission method, an article information transmission system and an article information transmission method in accordance with the present invention will be described in detail with reference to the accompanying drawings.

Figure 1:
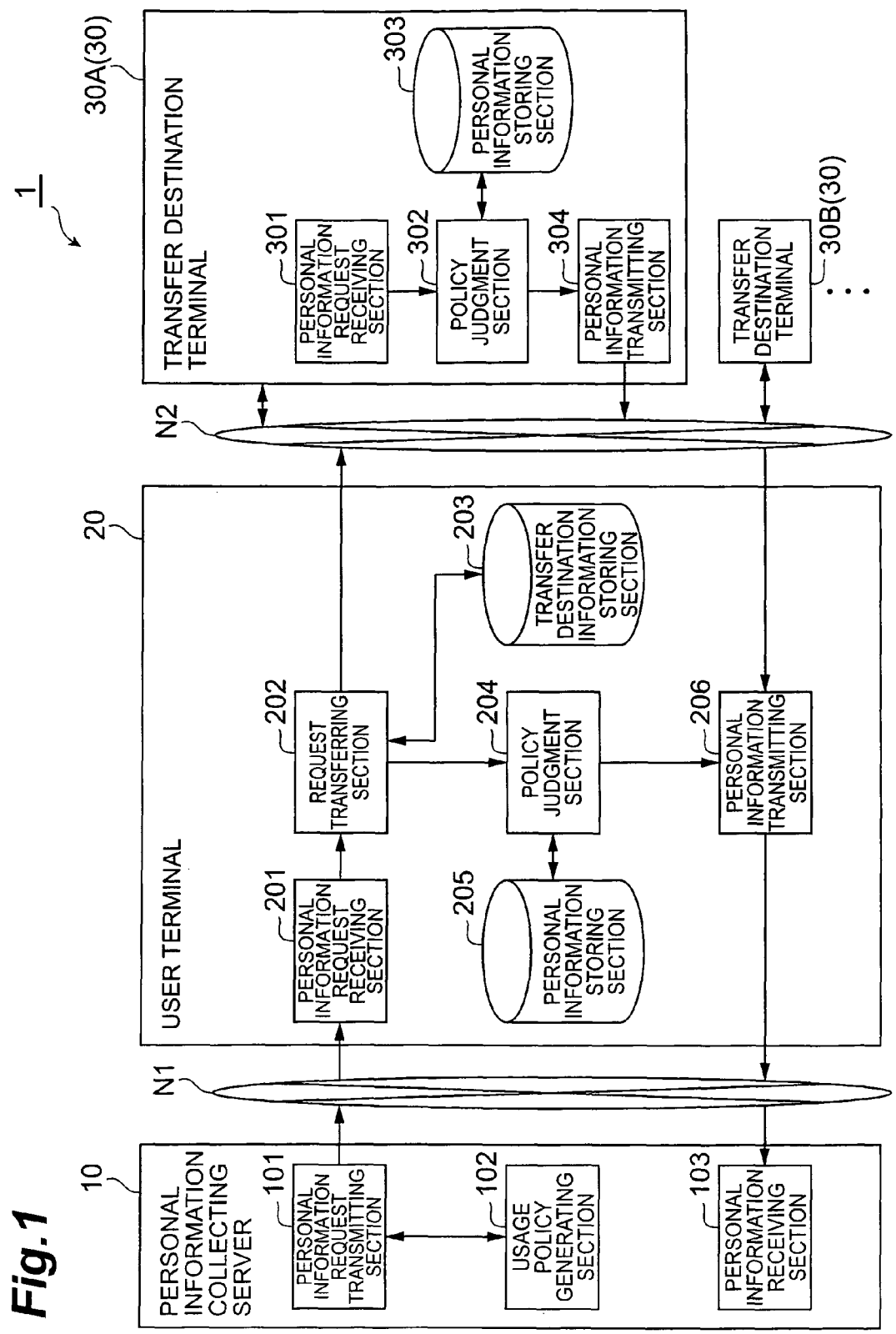
FIG. 1 is a configuration diagram showing an embodiment of a personal information collection system configured including an information transmission terminal according to the present invention.

FIG. 1 is a configuration diagram showing an embodiment of a personal information collection system 1, which is configured including an information transmission terminal in accordance with the present invention. The personal information collection system 1 comprises a personal information collecting server (predetermined communication device) 10, a user terminal (information transmission terminal) 20 and a plurality of transfer destination terminals 30 (30A, 30B ... ) as shown in FIG. 1. The personal information collection system 1 is a system managed and operated by a service provider A who provides various services utilizing personal information, and is configured as a system, which collects personal information of a plurality of users held by the respective transfer destination terminals 30 with the user terminal 20 as a terminal. The personal information collecting server 10 and the user terminal 20 are connected so as to allow information communication mutually through a network N1, and the user terminal 20 and the plurality of transfer destination terminals 30 are connected so as to allow information communication mutually through a network N2. The respective component elements will be described in detail below.

The personal information collecting server 10 is a computer system physically including a CPU, a memory, a communication interface and a storage section such as a hard disk, a display section such as a display and the like. Further, the personal information collecting server 10 includes the following functional component elements; i.e., a personal information request transmitting section 101, a usage policy generating section 102 and a personal information receiving section 103.

Figure 2:
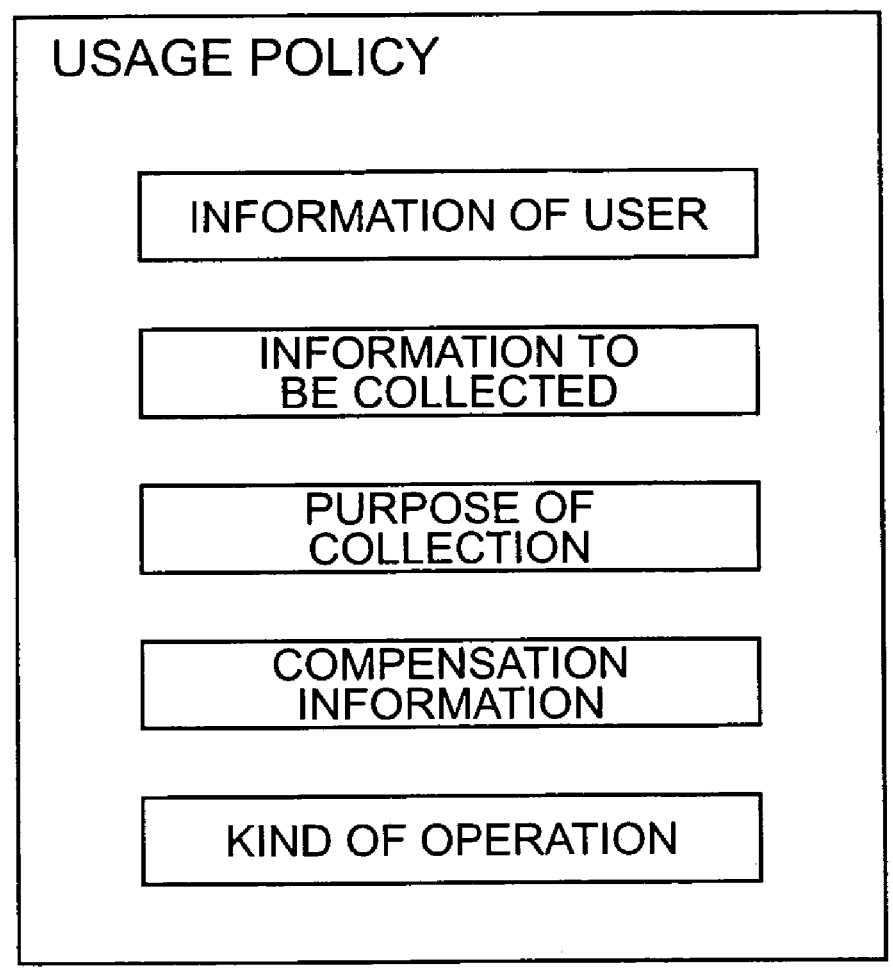
FIG. 2 is a diagram showing an example of a usage policy of personal information.

The personal information request transmitting section 101 is a section that transmits transmission request information to request a transmission of personal information and a usage policy prescribing a utilization range of the personal information to the user terminal 20. The usage policy generating section 102 is a section that generates a usage policy of the personal information. FIG. 2 shows an example of the usage policy generated by the usage policy generating section 102.

In the example shown in FIG. 2, the prescription items of the usage policy includes "information of user" representing a user of the personal information, "information to be collected" representing kinds of the personal information to be collected, "purpose of collection" representing a usage purpose of the collected personal information, "information of compensation" representing a compensation for transmission of the personal information and "kind of operation" representing the usage mode of the personal information. The respective prescription items store the following information; i.e., "service provider A" as the information of user, "information of user location" as the information to be collected, "to provide advertisement distribution corresponding to the location of a user" as the purpose of collection, "to provide services" as the information of compensation, "read only" as the kind of operation or the like as shown in FIG. 3.

The personal information receiving section 103 is a section that receives personal information or non-disclosure information, which represents the prohibition of disclosure of the personal information, from the user terminal 20. Further, when the user terminal 20 receives no response from any of the transfer destination terminals 30 (which will be described later), the personal information receiving section 103 receives information of absence representing the absence of the transfer destination terminals 30 from the user terminal 20.

The user terminal 20 is, for example, a portable telephone owned by a user K as a member of the service provider A. The user terminal 20 physically includes a CPU (central processing unit), a storage device such as a memory, an input device such as push buttons, a display device such as a display and the like. In addition to call functions, the user terminal 20 has various data communication functions including a function to access and browse a WEB page, an e-mail transmission function and the like. The user terminal 20 has the following functional component elements; i.e., a personal information request receiving section 201, a request transferring section 202, a transfer destination information storing section 203, a policy judgment section 204, a personal information storing section 205 and a personal information transmitting section 206.

The personal information request receiving section 201 is a section that receives the transmission request information and the usage policy thereof from the personal information collecting server 10. The personal information request receiving section 201 outputs the received transmission request information and the usage policy to the request transferring section 202. The request transferring section 202 is a section that transfers the transmission request information and the usage policy received from the personal information request receiving section 201 in accordance with a transfer destination reference table stored in the transfer destination information storing section 203.

Figure 4:
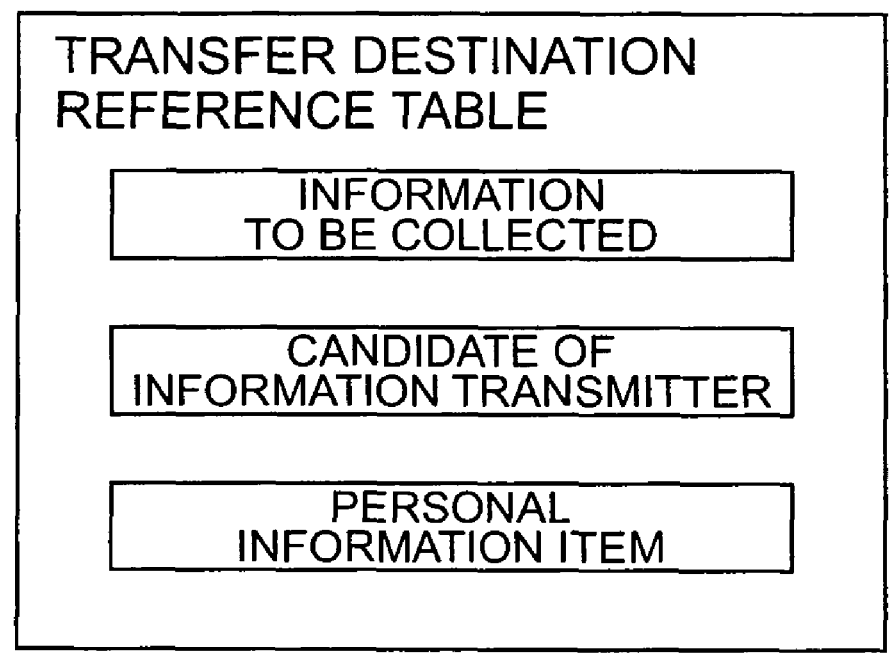
FIG. 4 is a diagram showing an example of a transfer destination reference table.

FIG. 4 shows an example of the transfer destination reference table. In the example shown in FIG. 4, the transfer destination reference table includes the following prescription items; i.e., "information to be collected" representing kinds of the personal information, "candidates of information transmitter" representing candidates of transfer destination of the transmission request information and the usage policy, and "personal information items" representing items requested to be transmitted to the transfer destination. The respective prescription items store the following information; i.e., "information of user location" as the information to be collected, "user terminal only" as the candidate of information transmitter and "present location" as the personal information items as shown in FIG. 5.

To be more precise, the request transferring section 202 makes reference to a column of the candidate of information transmitter associated with the information to be collected in the transfer destination reference table, which agrees with the information to be collected indicated by the usage policy. When the candidate of information transmitter is "user terminal only", the request transferring section 202 outputs the transmission request information and the usage policy to the policy judgment section 204 only. Further, when the candidate of information transmitter is "user terminal broadcast", the request transferring section 202 outputs the transmission request information and the usage policy to the policy judgment section 204, and transmits the transmission request information and the usage policy to each of the transfer destination terminals 30. Then, when the candidate of information transmitter is "broadcast", the request transferring section 202 does not output the transmission request information and the usage policy to the policy judgment section 204, but transmits the same to each of the transfer destination terminals 30 only.

Figure 6:
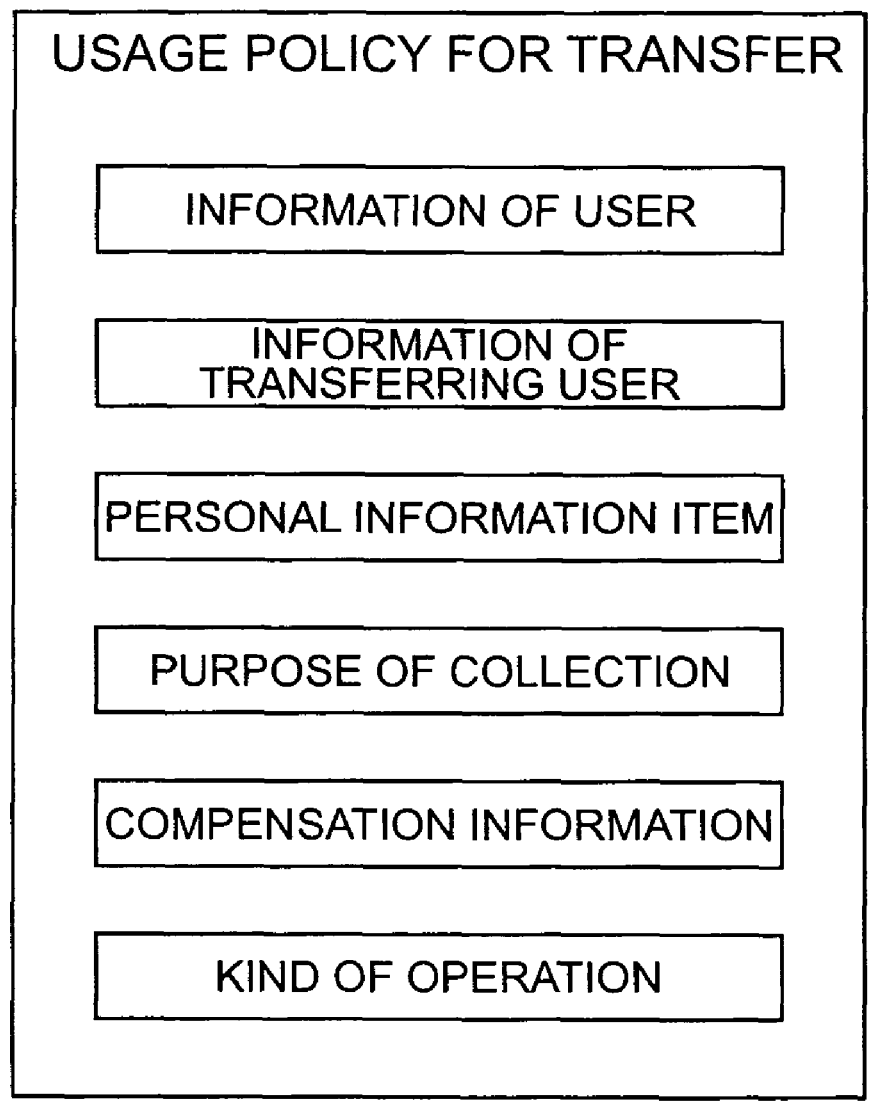
FIG. 6 is a diagram showing an example a usage policy for transfer.

At this time, when the request transferring section 202 transfers the transmission request information and the usage policy to each of the transfer destination terminals 30, the request transferring section 202 outputs shift instruction information, which instructs to shift to a standby mode waiting for a transmission of the personal information from the respective transfer destination terminals 30, to the personal information transmitting section 206. Further, in place of the usage policy received from the personal information request receiving section 201, the request transferring section 202 transfers a usage policy for transfer, which is generated by changing a part of the usage policy, to the respective transfer destination terminals 30. FIG. 6 shows an example of the usage policy for transfer.

In the example shown in FIG. 6, the prescription items of the usage policy for transfer include the following information; i.e., "information of user" representing a user of the personal information, "information of transferring user" representing a user identifying information for identifying a user of the user terminal 20, "personal information items" representing items requested to be transmitted to a transfer destination, "purpose of collection" representing a usage purpose of the collected personal information, "information of compensation" representing a compensation for transmission of the personal information, and "kinds of operation" representing usage modes of the personal information. The respective prescription items store the following information; i.e., "service provider A" as the information of user, "user K" as the information of transferring user, "name" as the requested personal information, "in order that user K receives imparted point from service provider A" as the purpose of collection, "none" as the information of compensation, and "read only" as the kind of operation as shown in FIG. 7.

When the policy judgment section 204 receives the transmission request information and the usage policy from the request transferring section 202, the policy judgment section 204 judges whether or not the usage policy satisfies a privacy policy of the personal information stored in the personal information storing section 205. Here, FIG. 8 shows an example of the personal information stored in the personal information storing section 205. In the example shown in FIG. 8, the following personal information is stored; i.e., "user K" as the name, "female" as the sex, "OOyears old" as the age, "090-OOOO-OOOO" as the telephone number, "userk@xxx.xxx" as the mail address, "north latitude OO°, east longitude OO°" as the present location, "bag, wallet, umbrella" as carrying articles or the like.

Figure 9:
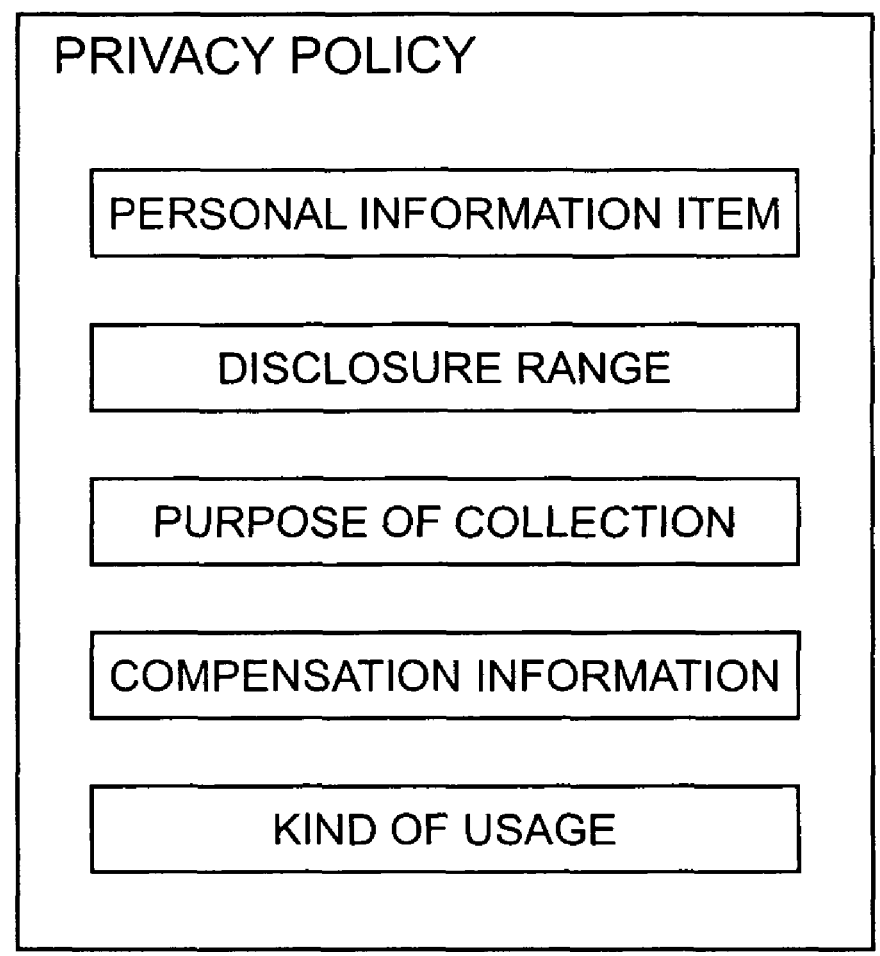
FIG. 9 is a diagram showing an example of privacy policy of personal information in the user terminal.

Further, FIG. 9 shows an example of the privacy policy associated with the personal information. In the example shown in FIG. 9, the following information is stored as the prescription items of the privacy policy; i.e., "personal information items" representing items to be transmitted, "disclosure range" representing a range to which disclosure of the personal information is allowed, "purpose of collection" representing the range of collection purpose in which the disclosure of the personal information is allowed, "information of compensation" representing desired compensation for the disclosure of the personal information, and "kinds of usage" representing usage modes allowing disclosure of the personal information. The respective prescription items store the following information; i.e., "present location" as the personal information item, "contracted service provider" as the disclosure range, "advertisement distribution or questionnaire" as the purpose of collection, "providing service or grant of points" as the information of compensation, and "read only" as the kind of usage as shown in FIG. 10.

Then, when the policy judgment section 204 judges that the respective prescription items of the usage policy (refer to FIG. 7) received from the request transferring section 202 satisfy the respective prescription items of the privacy policy, the policy judgment section 204 reads out the requested personal information from the personal information storing section 303 and outputs the same to the personal information transmitting section 206. Further, when the policy judgment section 204 judges that the respective prescription items of the usage policy do not satisfy the respective prescription items of the privacy policy, the policy judgment section 204 outputs non-disclosure information, which represents that the personal information should not be disclosed, to the personal information transmitting section 206.

The personal information transmitting section 206 is a section that transmits the personal information held by the user terminal 20 and the personal information held by the respective transfer destination terminals 30 to the personal information collecting server 10. To be more precise, when the personal information transmitting section 206 receives the personal information or the non-disclosure information from the policy judgment section 204, the personal information transmitting section 206 transmits the information to the personal information collecting server 10.

When the personal information transmitting section 206 receives shift instruction information from the request transferring section 202, the personal information transmitting section 206 shifts into the standby mode waiting for a transmission of the personal information from the respective transfer destination terminals 30 for a predetermined period of time. When the personal information transmitting section 206 receives the personal information or the non-disclosure information from the respective transfer destination terminals 30 during shifting to the standby mode, the personal information transmitting section 206 transmits the information to the personal information collecting server 10 along with the personal information of the user terminal 20. Contrarily, when the personal information transmitting section 206 does not receive the personal information or the non-disclosure information from any of the respective transfer destination terminals 30 during shifting to the standby mode, the personal information transmitting section 206 transmits information of absence, which represents absence of the respective transfer destination terminals 30, to the personal information collecting server 10.

The transfer destination terminals 30 (30A, 30B . . . ) are portable telephones respectively owned by, for example, users L (other users) residing around the user K of the user terminal 20. The transfer destination terminal 30 physically includes a CPU (central processing unit), a storage device such as a memory, an input device such as push buttons, a display device such as a display and the like. Also, in addition to call functions, various data communication functions including a function to access and browse a WEB page and e-mail transmission function and the like. Further, the transfer destination terminal 30 includes the following functional component elements; i.e., a personal information request receiving section 301, a policy judgment section 302, a personal information storing section 303 and the personal information transmitting section 304.

The personal information request receiving section 301 is a section that receives a transmission request information and the usage policy transferred from the user terminal 20. The personal information request receiving section 301 outputs the received transmission request information and the usage policy for transfer to the policy judgment section 302. When the policy judgment section 302 receives the transmission request information and the usage policy for transfer from the personal information request receiving section 301, the policy judgment section 302 judges whether or not the usage policy satisfies the privacy policy for transfer of the personal information stored in the personal information storing section 303.

An example of the personal information stored in the personal information storing section 303 is shown in FIG. 11. In the example shown in FIG. 11, the following personal information is stored; i.e., "user L" as the name, "male" as the sex, "xx years old" as the age, "090-xxxx-xxxx" as the telephone number, "user1@xxx.xxx" as the mail address, "north latitude xx°, east longitude xx°" as the present location, "bag, cap" as the carrying articles and the like.

Figure 12:
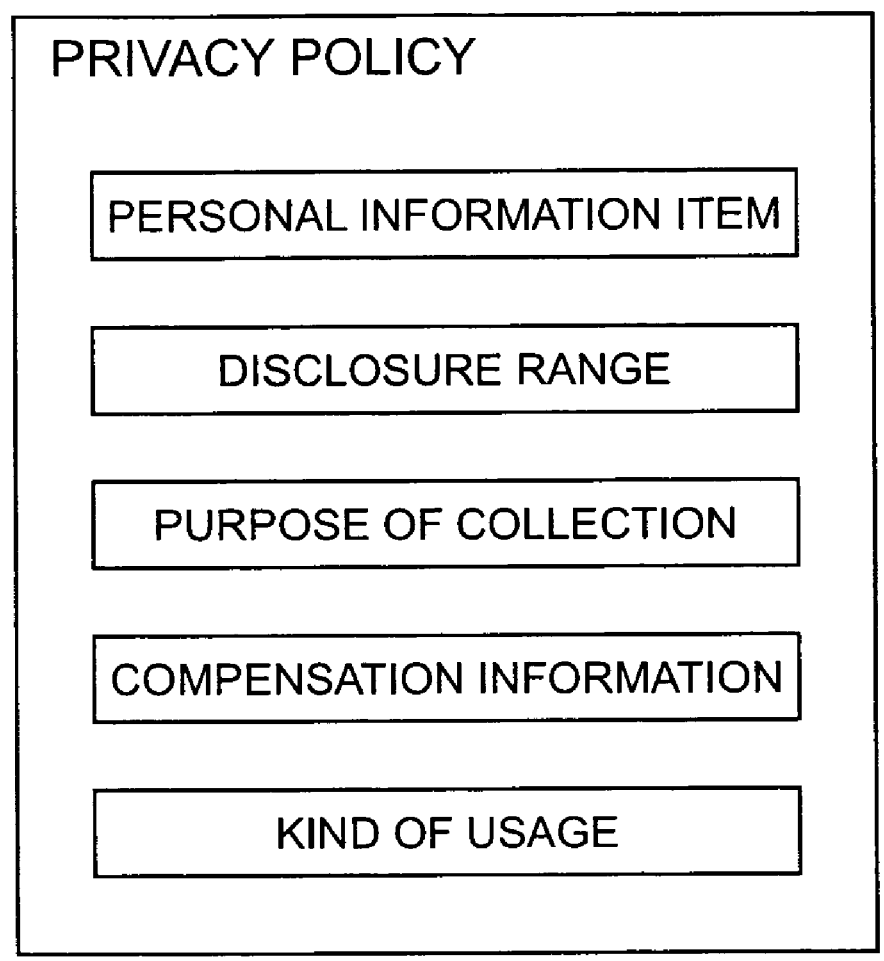
FIG. 12 is a diagram showing an example of privacy policy of the personal information in the transfer destination terminal.

In addition, FIG. 12 shows an example of the privacy policy associated with the personal information. In the example shown in FIG. 12, the following prescription items are stored as the privacy policy; i.e., "personal information items" representing the items to be transmitted, "disclosure range" representing a range to which disclosure of the personal information is allowed, "purpose of collection" representing a range of collection purpose in which the disclosure of the personal information is allowed, "information of compensation" representing a desired compensation for the disclosure of the personal information and "kinds of usage" representing usage modes allowing disclosure of the personal information. The respective prescription items store the following information; i.e., "present location" as the personal information item, "contracted service provider" as the disclosure range, "advertisement distribution" as the purpose of collection, "providing service" as the information of compensation and "read only" as the kind of usage as shown in FIG. 13.

In addition, when the policy judgment section 302 judges that the respective prescription items of the usage policy for transfer (refer to FIG. 6) received from the personal information request receiving section 301 satisfy the respective prescription items of the privacy policy, the policy judgment section 302 reads out the requested personal information from the personal information storing section 303 and outputs the same to the personal information transmitting section 304. Further, when the policy judgment section 302 judges that the respective prescription items of the usage policy do not satisfy the respective prescription items of the privacy policy, the policy judgment section 302 outputs non-disclosure information, which represents that the personal information should not be disclosed, to the personal information transmitting section 304.

The personal information transmitting section 304 is a section that transmits personal information held by the transfer destination terminal 30 to the user terminal 20. When the personal information transmitting section 304 receives the personal information or the non-disclosure information from the policy judgment section 302, the personal information transmitting section 304 transmits the information to the user terminal 20.

Next, the operation of the personal information collection system 1 having the above-described configuration will be described while making reference to a sequence diagram shown in FIG. 14.

Figure 14:
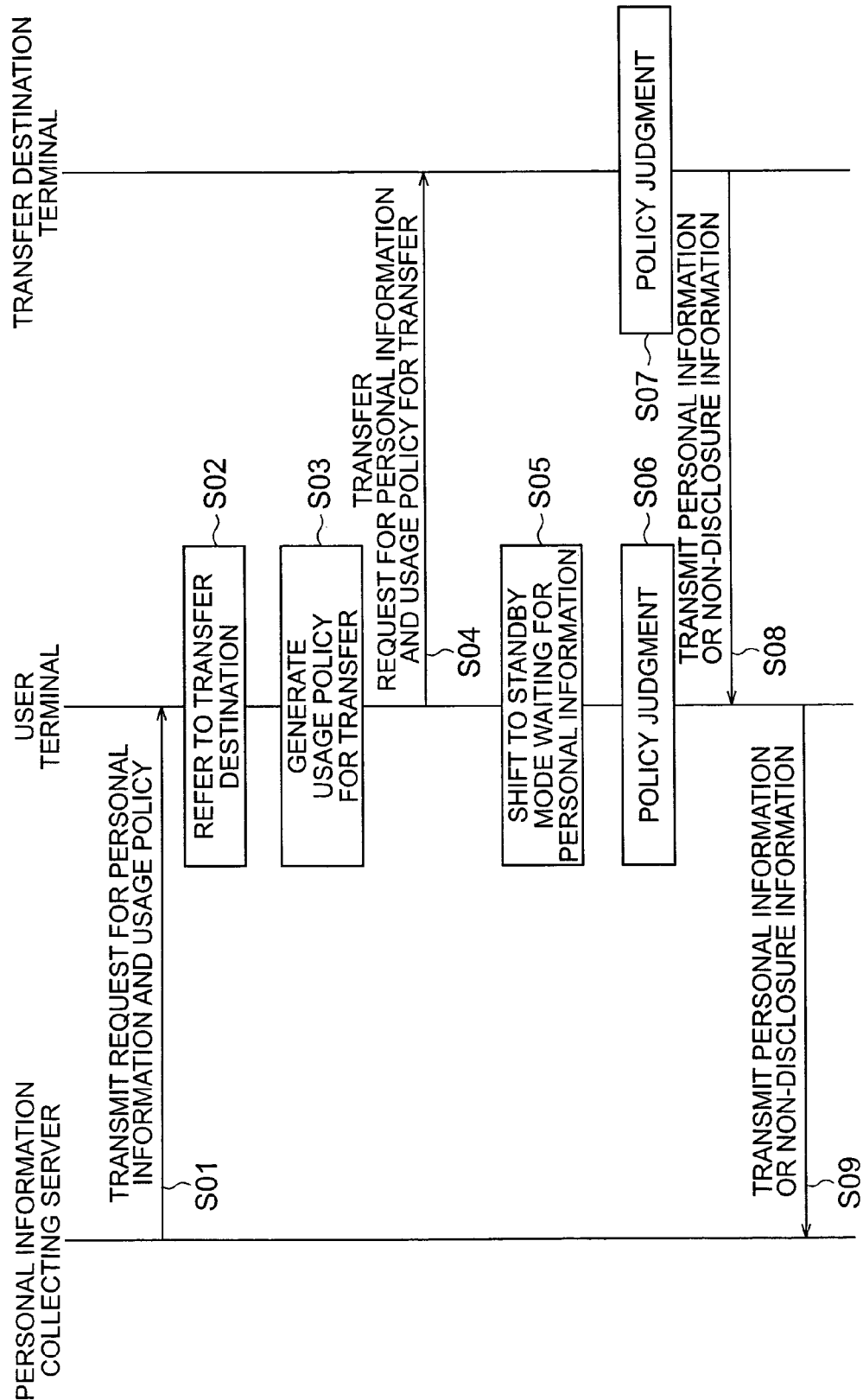
FIG. 14 is a sequence diagram showing an operation of the personal information collection system shown in FIG. 1.

First of all, the transmission request information and the usage policy are transmitted from the personal information collecting server 10 to the user terminal 20 as shown in FIG. 14 (step S01). Receiving the transmission request information and the usage policy, the user terminal 20 makes reference to the transfer destination reference table (step S02). Here, when the transfer destination indicated by the transfer destination reference table is "user terminal broadcast", the user terminal 20 generates the usage policy for transfer (step S03), and the transmission request information and the transferring usage policy are transmitted to the respective transfer destination terminals 30 (step S04). The user terminal 20 shifts into the standby mode waiting for a transmission of personal information from the respective transfer destination terminals 30 for a predetermined period of time (step S05).

After the step S05, the user terminal 20 and the respective transfer destination terminals 30 judge the policy respectively (step S06, step S07). In accordance with the judgment result of the policy, the personal information or non-disclosure information is transmitted from the respective transfer destination terminals 30 to the user terminal 20 (step S08). The personal information or non-disclosure information received by the user terminal 20 is transmitted to the personal information collecting server 10 along with the personal information or non-disclosure information of the user terminal 20 (step S09). When no personal information or non-disclosure information is transmitted to the user terminal 20 from any of the respective transfer destination terminals 30, information of absence is transmitted from the user terminal 20 to the personal information collecting server 10.

In the step S02, when the transfer destination indicated by the transfer destination reference table is "broadcast", the policy judgment by the user terminal is not made (step S06). In this case, the personal information or non-disclosure information only from the respective transfer destination terminals 30 is transmitted from user terminal 20 to the personal information collecting server 10 in step S09. Also, when the transfer destination indicated by the transfer destination reference table is "user terminal only" in the step S02, the steps S03 to S05 and steps S07 to S08 are omitted. In this case, the policy judgment is made by the user terminal 20 only, and only the personal information or non-disclosure information of the user terminal 20 is transmitted from the user terminal 20 to the personal information collecting server 10 in step S09.

As described above, the user terminal 20 transfers the transmission request and the usage policy of the personal information to the respective transfer destination terminals 30 in accordance with the kind of the personal information requested from the personal information collecting server 10. The personal information, which is transmitted from the respective transfer destination terminals 30 responding to this, is collected by the user terminal 20 and transmitted to the personal information collecting server 10. Here, the respective transfer destination terminals 30 are adapted so as to judge whether or not the transmission of the requested personal information violates the privacy of the users of the terminals 30 based on the transferred usage policy. Therefore, the personal information managed by the users of the respective transfer destination terminals 30 can be transmitted to the personal information collecting server 10 as a batch with the user terminal 20 as a terminal while protecting the user privacy via the user terminal 20. This increases collecting performance of the personal information and allows the service provider A, who manages and operates the personal information collection system 1 to establish a highly sophisticated service providing system utilizing the personal information.

Further, when the user terminal 20 transfers the transmission request information to the respective transfer destination terminals 30, the user terminal 20 generates and transmits the usage policy for transfer in which user information for identifying the user of the user terminal 20 is added to the usage policy, which is received from the personal information collecting server 10. Owing to this, the respective transfer destination terminals 30 are allowed to know the user of the user terminal 20 as the terminal, thus the transmission of the personal information from the respective transfer destination terminals 30 can be further accelerated. Further, when no transmission of the personal information or non-disclosure information is received from any of the respective transfer destination terminals 30 while shifting to the standby mode, the user terminal 20 transmits the information of absence to the personal information collecting server 10. Owing to this, the personal information collecting server 10 can know the collecting state of the personal information from the respective transfer destination terminals 30, thus the collecting performance of the personal information can be further improved.

Next, a preferred embodiment of an article information transmission system according to the present invention will be described in detail below.

Figure 15:
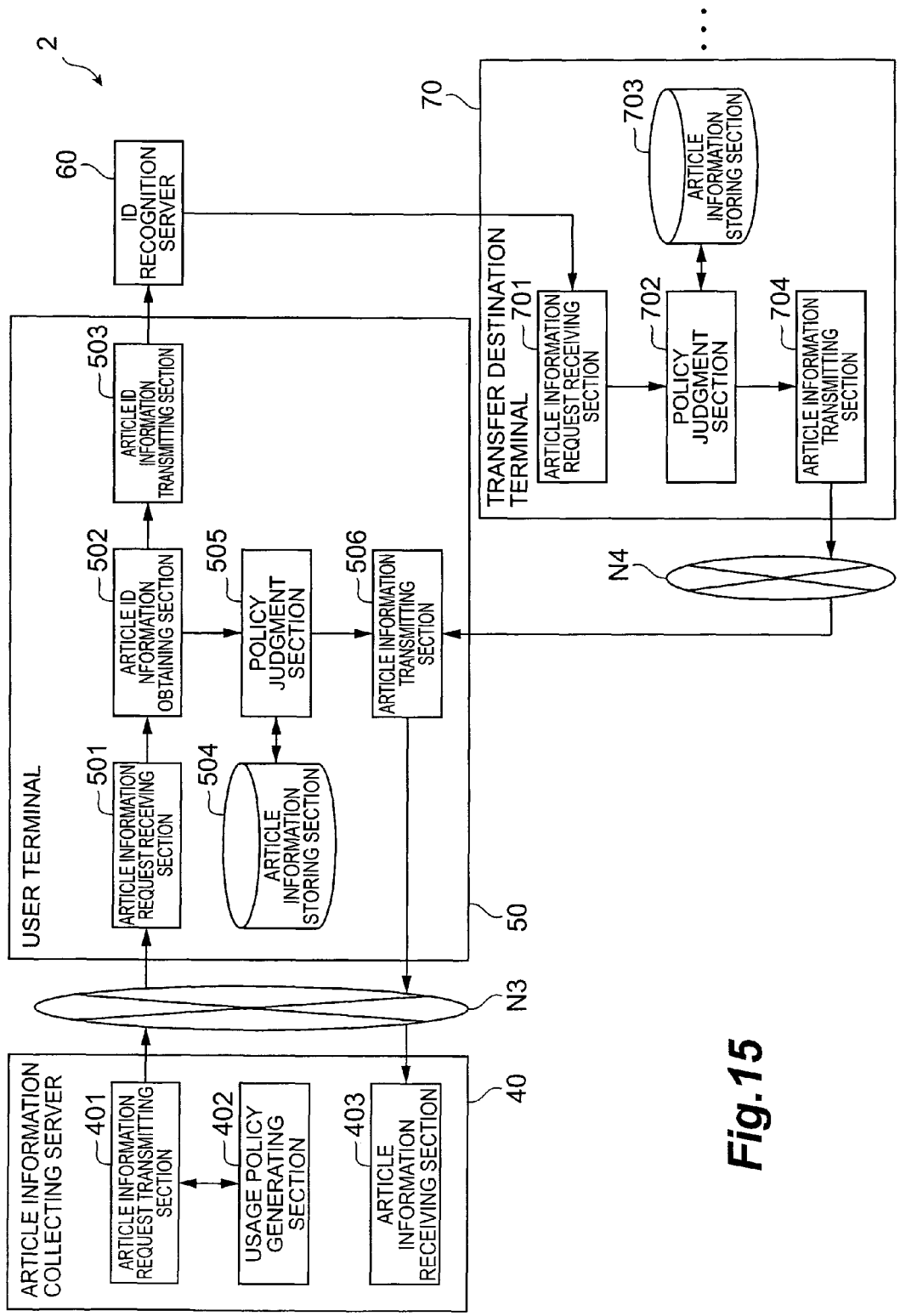
FIG. 15 is a configuration diagram showing an embodiment of the article information transmission system according to the present invention.

FIG. 15 is a configuration diagram showing an embodiment of the article information transmission system according to the present invention. The article information transmission system 2 is composed of a user terminal 50, an ID recognition server (owner information storing means, request transferring means) 60 and a plurality of transfer destination terminals 70 as shown in FIG. 15. The article information transmission system 2 is a system managed and operated by a service provider A, who provides various services utilizing article information, and is configured as a system which transmits article information of articles around the user who owns the user terminal 50 to an article information collecting server (predetermined communication device) 40.

The article information collecting server 40 and the user terminal 50 are connected via a network N3 so as to allow information communication mutually; and the user terminal 50 and a plurality of transfer destination terminals 70 are connected via a network N4 so as to allow information communication mutually. Further, the ID recognition server 60 is configured so as to allow information communication between the user terminal 50 and the respective transfer destination terminals 70 and the same. The respective component elements will be described below.

The article information collecting server 40 comprises the following functional component elements; i.e., an article information request transmitting section 401, a usage policy generating section 402 and an article information receiving section 403. The article information request transmitting section 401 is a section that transmits a transmission request information, which requests for transmission of article information, and usage policy thereof to the user terminal 50. The usage policy-generating section 402 is a section that generates a usage policy of the article information. Further, the article information receiving section 403 is a section that receives article information or non-disclosure information, which indicates that the article information is prohibited from disclosure, from the user terminal 50.

FIG. 16 shows an example of the usage policy generated by the usage policy-generating section 402. In the example shown in FIG. 16, the following information is stored; i.e., "service provider A" as an information of user, "brand name" as items to be collected, "questionnaire for improving services" as a purpose of collection, "grant of points" as information of compensation and "read only" as kinds of operation or the like.

The user terminal 50 is, for example, a portable telephone owned by a user K as a member of the service provider A, and includes the following functional component elements; i.e., an article information request receiving section 501, an article ID information obtaining section (identification information obtaining means) 502, an article ID information transmitting section 503, an article information storing section 504, a policy judgment section 505 and an article information transmitting section 506.

The article information request receiving section 501 is a section that outputs the transmission request information and the usage policy received from the article information collecting server 40 to the article ID information obtaining section 502. The article ID information obtaining section 502 is a section that obtains article ID information (article identification information) for identifying an article using an RFID tag (identification element) attached to articles (not shown) around the user.

To be more precisely, when the article ID information obtaining section 502 receives the transmission request information and the usage policy from the article information request transmitting section 401, the article ID information obtaining section 502 transmits a beacon signal toward articles within a predetermined range from the user terminal 50, and obtains article ID information outputted responding thereto from the RFID tag of the articles. The article ID information obtaining section 502 outputs the obtained article ID information to the article ID information transmitting section 503 and the policy judgment section 505 along with the transmission request information and the usage policy. The article ID information transmitting section 503 transmits the received information to the ID recognition server 60.

The policy judgment section 505 is a section that makes reference to the article information storing section 504 in accordance with the article ID information received from the article ID information obtaining section 502, and when any article information, which agrees with the article ID information, is stored in the article information storing section 504, the policy judgment section 505 judges whether or not the usage policy satisfies the privacy policy of the article information.

FIG. 17 shows an example of article information stored in the article information storing section 504. In the example shown in FIG. 17, the following information is stored as the article information; i.e., "wallet" as article information, "0011102" as ID information, "red" as color, "Made of OO" as brand and "OO OO, OOOO" as date of manufacture. FIG. 18 shows an example of the privacy policy. In the example shown in FIG. 18, the following information is stored as prescription items of the privacy policy; i.e., "brand name" as the item to be collected, "all" as disclosure range, "advertisement distribution or questionnaire" as purpose of collection, "grant of points" as information of compensation and "read only" as kind of usage.

In addition, when the policy judgment section 505 judges that the respective prescription items (refer to FIG. 16) of the usage policy satisfy the respective prescription items of the privacy policy, the policy judgment section 505 reads out the requested article information from the article information storing section 504 and outputs the same to the article information transmitting section 506. Further, when the policy judgment section 505 judges that the respective prescription item of the usage policy do not satisfy the respective prescription items of the privacy policy, the policy judgment section 505 outputs non-disclosure information, which indicates that the disclosure of the article information is prohibited, to the article information transmitting section 506.

The article information transmitting section 506 is a section that transmits article information held by the user terminal 50 and article information held by the respective transfer destination terminals 70 to the article information collecting server 40. Particularly, when the article information transmitting section 506 receives the article information or non-disclosure information from the policy judgment section 505 and the respective transfer destination terminals 70, the article information transmitting section 506 transmits the information to the article information collecting server 40.

The ID recognition server 60 is, for example, a server managed by an organization granted with a high reliability such as CA (certificate authority), which stores an owner reference table, in which an owner information indicating owner of the article is previously associated with the article ID information. FIG. 19 shows an example of the owner reference table. In the example shown in FIG. 19, the owner reference table stores "0011100" as article ID information and "user S (192.168.1.1)" as the owner information. The ID recognition server 60 transfers the transmission request information and the usage policy to a transfer destination terminal 70 owned by an owner indicated by the owner information corresponding to the article ID information received from the user terminal 50.

The transfer destination terminal 70 is, for example, a portable telephone owned by each of other users around the user of the user terminal 50, and includes the following functional component elements; i.e., an article information request receiving section 701, a policy judgment section 702, an article information storing section 703 and an article information transmitting section 704.

The article information request receiving section 701 is a section that receives the transmission request information and the usage policy transferred from the ID recognition server 60. The article information request receiving section 701 outputs the received transmission request information and the usage policy for transfer to the policy judgment section 702. When receiving the transmission request information and the usage policy from the article information request receiving section 701, the policy judgment section 702 judges whether or not the usage policy satisfies the privacy policy of the article information stored in the article information storing section 703.

FIG. 20 shows an example of the article information stored in the article information storing section 703. In the example shown in FIG. 20, the following information is stored as the article information; i.e., "bag " as article information, "0011100" as ID information, "black" as color, "made of xx" as brand, and "xx xx, xxxx" as date of manufacture. FIG. 21 shows an example of the privacy policy. In the example shown in FIG. 21, the following information is stored as the prescription items of the privacy policy; i.e., "brand name" as the item to be collected, "all" as disclosure range, "questionnaire" as purpose of collection, grant of points" as information of compensation and "read only" as kind of usage.

When the policy judgment section 702 judges that the respective prescription items (refer to FIG. 16) of the usage policy, which is received from the article information request receiving section 701, satisfy the respective prescription items of the privacy policy, the policy judgment section 702 reads out the requested article information from the article information storing section 703 and outputs the same to the article information transmitting section 704. Further, when the policy judgment section 702 judges that respective prescription items of the usage policy do not satisfy the respective prescription items of the privacy policy, the policy judgment section 702 outputs non-disclosure information, which indicates that the disclosure of the article information is prohibited, to the article information transmitting section 704.

The article information transmitting section 704 is a section that transmits the article information held by the transfer destination terminal 70 to the user terminal 50. When the article information transmitting section 704 receives the article information or non-disclosure information from the policy judgment section 702, the article information transmitting section 704 transmits the information to the user terminal 50.

Next, the operation of the article information transmission system 2 having above-described configuration will be described while making reference to a sequence diagram shown in FIG. 22.

Figure 22:
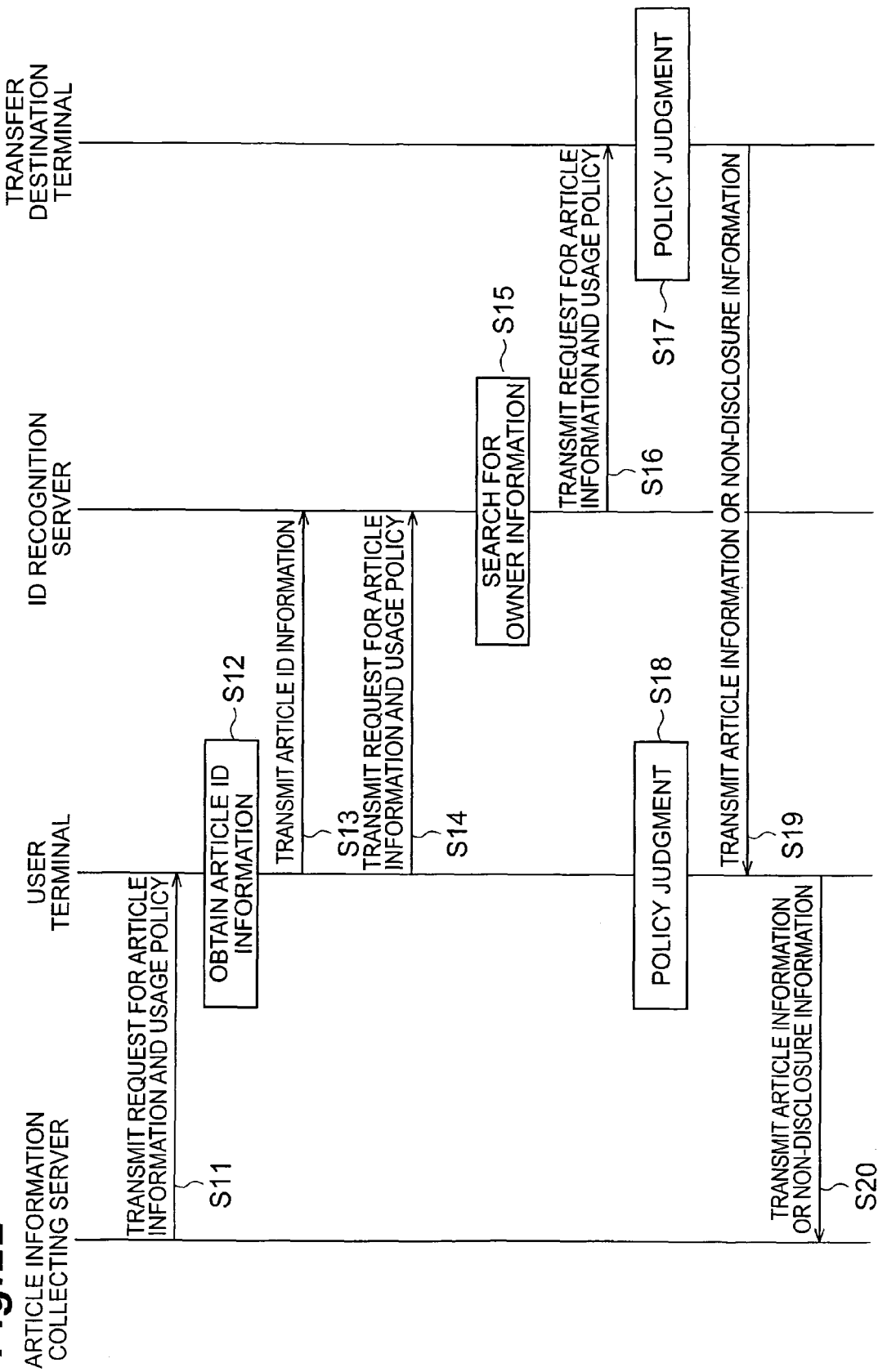
FIG. 22 is a sequence diagram showing an operation of the article information transmission system shown in FIG. 15.

First of all, a transmission request information and a usage policy are transmitted from the article information collecting server 40 to the user terminal 50 (step S11) as shown in FIG. 22. When the user terminal 50 receives the transmission request information and the usage policy, the user terminal 50 obtains an article ID information from an RFID tag attached to an article around the user terminal 50 (step S12). The user terminal 50 transmits the obtained article ID information to the ID recognition server 60 along with the transmission request information and the usage policy (step S13, step S14).

The ID recognition server 60 searches owner information based on the received article ID information (step S15). When the owner is determined, the transmission request information and the usage policy are transferred from the ID recognition server 60 to the owner's transfer destination terminal 70 (step S16). When the transfer destination terminal 70 receives the transmission request information and the usage policy, the transfer destination terminal 70 judges the policy (step S17) and the article information or non-disclosure information are transmitted from the transfer destination terminal 70 to the user terminal 50 in accordance with the judgment result of the policy (step S19).

On the other hand, when article information, which agrees with the obtained article ID information, is stored in the user terminal 50 in step S12, the user terminal 50 also judges the policy (step S18). And the article information or non-disclosure information of the user terminal 50 is transmitted from the user terminal 50 to the article information collecting server 40 along with the article information or non-disclosure information received from the transfer destination terminal 70 (step S20).

As described above, in the article information transmission system 2, when the transmission request information and the usage policy from the article information collecting server 40 are received, the owner of the article is identified from the article ID information of the article around the user terminal 50. And, the transmission request information and the usage policy are transferred to the owner's transfer destination terminal 70, and responding to this, the article information transmitted from the transfer destination terminal 70 is collected by the user terminal 50 and transmitted to the article information collecting server 40. At this time, the transfer destination terminal 70 is adapted so as to judge whether or not the transmission of requested article information violates the privacy of the owner of the article based on the transferred usage policy. Therefore, in the article information transmission system 2, the article information of an article owned by another user can be transmitted to the article information collecting server 40 while protecting the privacy of the user using the user terminal 50 as the terminal. This increases collecting performance of article information and allows the service provider A, who manages and operates the article information transmission system 2, to establish a highly sophisticated service providing system utilizing article information.

Also, in the article information transmission system 2, to identify the owner from the article ID information, the article ID information is transmitted to the ID recognition server 60, which is managed by a highly reliable authority, and the ID recognition server 60 searches the owner. By interposing the ID recognition server 60 as described above article information under the control of another user can be prevented from being leaked to the user terminal 50, and the user privacy can be more reliably protected.

The present invention is not limited to the above-described embodiments. For example, the transfer destination reference table of the user terminal 20 may be adapted so as to prescribe the priority of the transfer destinations. In this case, it may be adapted so that for example, only when personal information requested by the personal information collecting server 10 does not reside in the user terminal 50, the transmission request information and usage policy are transferred to the respective transfer destination terminals 70. Alternatively, by classifying respective transfer destination terminals 70 to be transferred with the transmission request information and usage policy, and the transmission request information and usage policy may be transferred to the transfer destination terminals 70 on a higher priority basis.

Also, in the article information transmission system 2, the identification element for obtaining the article ID information is not limited to the RFID tag. Various devices mounted with a memory for storing the article ID information may be employed. Further, in view of prevention of abuse of the article information, a hash function may be employed to periodically change the article ID information.

What is claimed is:

1. An information transmission terminal for transmitting personal information of a plurality of users including a user of the information transmission terminal and respective users of other terminals to a predetermined communication device, comprising:

a request receiving unit that receives a transmission request information requesting a transmission of the personal information and a usage policy prescribing a utilization range of the personal information from the predetermined communication device;

a transfer destination information storing device that stores a transfer destination reference table previously associating the personal information with transfer destinations of the transmission request information and the usage policy based on an information to be collected representing one or more kinds of the personal information such that the transfer destination reference table indicates a candidate for transmitting personal information to the predetermined communication device out of the information transmission terminal and the other terminals;

a request transferring unit that transfers the transmission request information and the usage policy received by the request receiving unit to each of the other terminals when the transfer destination reference table indicates that the candidate for transmitting personal information to the predetermined communication device includes the other terminals;

a personal information storing device that stores personal information of the user of the information transmission terminal and a privacy policy of the personal information of the user of the information transmission terminal;

a policy judgment unit that determines whether the usage policy prescribing a utilization range of the personal information received from the predetermined communication device satisfies the privacy policy of the personal information of the user of the information transmission terminal when the transfer destination reference table indicates that the candidate for transmitting personal information to the predetermined communication device includes the information transmission terminal;

a personal information transmitting unit that transmits personal information received from respective ones of the other terminals when the transfer destination reference table indicates that the candidate for transmitting personal information to the predetermined communication device includes the other terminals and the usage policy satisfies a privacy policy of users of the respective ones of the other terminals, and transmits personal information of the information transmission terminal when the transfer destination reference table indicates that the candidate for transmitting personal information to the predetermined communication device includes the information transmission terminal and the policy judgment unit determines that the usage policy satisfies the privacy policy of the personal information of the user of the information transmission terminal, to the predetermined communication device in response to the transfer of the transmission request information and the usage policy by the request transferring unit.

2. The information transmission terminal according to claim 1, wherein the request transferring unit adds user identifying information for identifying a user of the information transmission terminal to the transmission request information and the usage policy to be transferred to the other terminals.

3. The information transmission terminal according to claim 1, wherein the personal information transmitting unit transmits information of absence representing absence of the other terminals to the predetermined communication device when the personal information transmitting unit receives no response from any of the other terminals until a predetermined period of time has passed from a point when the request transferring unit transfers the transmission request information and the usage policy to the other terminals.

4. An information transmission method implemented on an information transmission terminal for transmitting personal information of a plurality of users including a user of the information transmission terminal and respective users of other terminals, to a predetermined communication device, the method comprising:

receiving, at a request receiving unit of the information transmission terminal, a transmission request information requesting a transmission of the personal information and a usage policy prescribing a utilization range of the personal information from the predetermined communication device;

storing, at a personal information storing device, personal information of the user of the information transmission terminal and a privacy policy of the personal information of the user of the information transmission terminal;

storing, at a transfer destination information storing device of the information transmission terminal, a transfer destination reference table previously associating the personal information with transfer destinations of the transmission request information and the usage policy based on an information to be collected representing one or more kinds of the personal information such that the transfer destination reference table indicates a candidate for transmitting personal information to the predetermined communication device out of the information transmission terminal and the other terminals;

transferring, at a request transferring unit of the information transmission terminal, the transmission request information and the usage policy received by the request receiving unit to respective other terminals when the transfer destination reference table indicates that the candidate for transmitting personal information to the predetermined communication device includes the other terminals;

determining, at a policy judgment unit of the information transmission terminal, whether the usage policy prescribing a utilization range of the personal information received from the predetermined communication device satisfies the privacy policy of the personal information of the user of the information transmission terminal when the transfer destination reference table indicates that the candidate for transmitting personal information to the predetermined communication device includes the information transmission terminal;

transmitting, at a personal information transmitting unit of the information transmission terminal, personal information received from respective ones of the other terminals when the transfer destination reference table indicates that the candidate for transmitting personal information to the predetermined communication device includes the other terminals and the usage policy satisfies a privacy policy of users of the respective ones of the other terminals, and transmitting personal information of the information transmission terminal when the transfer destination reference table indicates that the candidate for transmitting personal information to the predetermined communication device includes the information transmission terminal and the policy judgment unit determines that the usage policy satisfies the privacy policy of the personal information of the user of the information transmission terminal, to the predetermined communication device in response to the transfer of the transmission request information and the usage policy by the request transferring unit.

* * * * *